United States Patent
Wu et al.

[11] Patent Number: 5,354,511
[45] Date of Patent: Oct. 11, 1994

[54] UNSYMMETRICALLY SUBSTITUTED FLUORENES FOR NON-LINEAR OPTICAL APPLICATIONS

[75] Inventors: Chengjiu Wu, Morristown; Jianhui Shan, Highbridge; Ajay Nahata, Rahway, all of N.J.

[73] Assignee: AlliedSignal Inc., Morristownship, N.J.

[21] Appl. No.: 983,065

[22] Filed: Nov. 27, 1992

[51] Int. Cl.$^5$ .............. F21V 9/00; C07C 321/00; C07C 211/00; C07C 255/00; C07C 315/00; C07C 321/00; C07D 303/08

[52] U.S. Cl. .................... 252/582; 252/587; 252/589; 549/551; 549/554; 549/561; 549/563; 564/315; 564/323; 560/9; 560/21; 560/22; 560/23; 560/36; 560/37; 560/45; 560/102; 560/141; 558/388; 558/401; 558/414; 558/416; 558/418; 558/420; 558/423; 558/427; 568/28; 568/29; 568/30; 568/31; 568/32; 568/33; 568/34; 568/35; 568/38; 568/39; 568/41; 568/42; 568/44; 568/45; 568/46; 568/47; 568/49; 568/51; 568/52; 568/54; 568/55; 568/56; 568/57; 568/58; 568/61; 568/62; 568/63; 568/64; 568/65; 568/66; 568/67; 568/579; 568/584; 568/630; 568/631; 568/632; 568/633; 568/634

[58] Field of Search .............. 252/582, 587, 589; 359/326, 328, 329; 549/551, 554, 561, 563; 564/315, 323; 560/9, 21, 22, 23, 36, 37, 45, 102, 141; 558/388, 401, 414, 416, 418, 420, 423, 427; 568/28, 29, 30, 31, 32, 33, 34, 35, 38, 39, 41, 42, 44, 45, 46, 47, 49, 51, 52, 54, 55, 56, 57, 58, 61, 62, 63, 64, 65, 66, 67, 579, 584, 630, 631, 632, 633, 634

[56] References Cited

U.S. PATENT DOCUMENTS 3,546,165 12/1970 Morgan .................. 523/466
4,684,678 8/1987 Schultz et al. ............ 523/466
5,176,854 1/1993 Ito et al. ................ 252/582

OTHER PUBLICATIONS

Korshak et al., "Cardo Polymers", J. Macromol.-Sci.—Rev. Macromol. Chem. C11(1), 45–142 (1974).
Nicoud et al., "Organic SHG Powder Test Data", Nonlinear Optical Properties Of Organic Molecules and Crystals, vol. 2 (1987).

*Primary Examiner*—Philip Tucker
*Attorney, Agent, or Firm*—Melanie L. Brown; Roger H. Criss

[57] ABSTRACT

Compounds having non-linear optical activity of the general formula

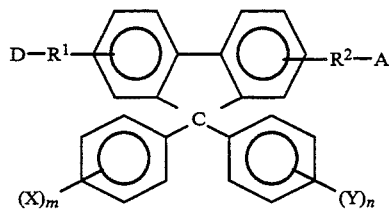

wherein D and A are electron donor and acceptor groups, respectively, $R^1$ and $R^2$ are aromatic bridging groups, X and Y are preferably groups capable of partaking in polymerization reactions are suitable for use in polymer-based light modulator devices.

12 Claims, No Drawings

UNSYMMETRICALLY SUBSTITUTED FLUORENES FOR NON-LINEAR OPTICAL APPLICATIONS

BACKGROUND OF THE INVENTION

Organic polymer materials which have large second order non-linear optical (NLO) response are of interest for optical applications including communications, data storage, and computing. Important applications include waveguides, interconnects, switches, and the like. Their advantages over the conventionally employed inorganic materials, e.g. $LiNbO_3$, in such applications include fast response time, large electro-optical response over a wide frequency range, low dielectric constant, compatibility with silicon wafer technology and others. However, NLO active polymers known from the prior art suffer from lack of long term stability under working temperature conditions, which limits their practical utility. The present invention provides fluorene-based compounds which are highly NLO active through their unsymmetrical substitution at the aromatic rings. Those which have functional groups which permit polymerization can be used for making NLO active polymers with high glass transition temperature; all can be used as additives in host-guest polymer systems. Some can be grown into non-centrosymmetric crystals.

SUMMARY OF THE INVENTION

This invention provides compounds (herein also referred to as "NLO chromophores") of the general formula (I):

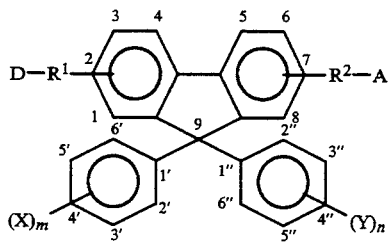

wherein m and n are independently integers of from 1 to 4;

$R^1$ and $R^2$, which are the same or different in different $D-R^1-$ and $A-R^2-$ groups, are independently $-Ar-$, $-Ar-CH=CH-$ or $-Ar-C\equiv C-$ wherein Ar is a divalent bridging group selected from the group consisting of a direct bond, phenylene, biphenylene, naphthalene and thienylene;

A, which is the same or different in different $A-R^2-$ groups, is $-NO_2$, $-CN$, $-SO_2R$, $-SO_2R_F$, $-COOR$, $-C(CN)=C(CN)_2$, or $-CH=C(CN)_2$ wherein $R_F$ is $-C_nF_{2n+1}$ wherein n is an integer of from 1 to 10;

R is alkyl, straight chain, branched or cyclic, having from 1 to about 10 carbons;

D, which is the same or different in different $D-R^1-$ groups, is $-NH_2$, $-NHR$, $-NR_2$, $-OH$, $-OR$, $-SH$ or $-SR$, wherein R is alkyl, straight chain, branched or cyclic, having from 1 to about 10 carbons;

X and Y are independently selected from the group consisting of H, $-NH_2$, $-NHR$, $-NR_2$, $-OH$, $-OR$, $-SH$, $-SR$, $-COOH$, $-NCO$,

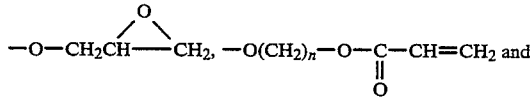

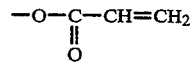

wherein n is an integer of from 1 to about 10, and

R is alkyl, straight chain, branched or cyclic, having from 1 to about 10 carbons.

For purposes of this invention, the term "non-linear optical ("NLO") collectively refers to materials characterized by non-linear resonsponse of polarization (dipole moment per volume) to applied electric or electromagnetic (optical) fields. Generally, NLO materials are classified according to the "order" of the nonlinear response. Thus, Second Order NLO materials respond to the square of the applied fields. Examples of Second Order NLO phenomena include: second harmonic generation (generation of light at twice the incident frequency); optical rectification (generation of an electric field in response to applied optical radiation); and electro-optic effect (change in optical refractive index in response to applied electric field). Third Order NLO materials respond to the cube of an applied electric or electromagnetic field. Exemplary Third Order NLO phenomena include: third harmonic generation (generation of light at three times the incident frequency) and sum and difference frequency generation (generation of a new optical frequency in the presence of two applied optical frequencies).

The NLO active chromophores of this invention contain both an electron donating group (designated D in formula (i), above) and an electron accepting group (designated A in formula (I), above), which are connected through $\pi$-chain links. These chromophores can be incorporated into optically clear (generally amorphous) polymers, as by blending, to form optically active compositions, e.g. for forming optically active waveguides. Those of the NLO chromophores which have terminal X and Y groups capable of partaking in polymerization reactions are monomers which can be polymerized (or copolymerized) into optically active clear polymers, which are useful for the same purpose.

The NLO activity of such chromophores is determined by the electron accepting and electron donating strength of the A and D groups, respectively, and the length of the $\pi$-chain—the longer the $\pi$-chain, the greater the NLO activity, other things being equal. However, in many NLO active organic compounds the beneficial effect of extension of the $\pi$-chain is offset by the free rotation of a single bond connecting the $\pi$ units. Structure-related inhibition of rotation around the $\pi$-bond(s) (also known as "planarization") in the chromophores of this invention maximizes their NLO activity. To render the polymer systems containing these NLO chromophores NLO active for 2nd order NLO processes, they must be non-centrosymmetrically aligned ("poled"). This can be achieved by electric field poling, e.g. by subjecting the polymer film to an applied electric field at a temperature above the glass transition temperature ($T_g$), followed by cooling to temperature below $T_g$ in the presence of the applied field.

Besides high NLO activity, other chemical and physical characteristics are essential for practical utility of such chromophores and the polymeric compositions into which they are incorporated. They should have favorable solubility in spin solvents, and sufficient molecular weight so that they can be applied in thin films by the spin coating procedure; they must be transparent in the desired optical frequency range; and they should have a high glass transition temperature ($T_g$) to prevent thermal relaxation (de-orientation) of "poled" films at working temperature.

The NLO chromophores of formula (I), above, have A and D groups spaced apart and connected through a rigid $\pi$-system in monomers of a type known for providing polymers having high temperature stability. The active groups for polymerization (the X and Y groups in formula (I), above) and the active groups for NLO activity (the A and D groups in formula (I), above) are independent of each other and non-interfering.

When these chromophores are blended into optically clear polymers, such as acrylates and methacrylates, the resulting polymer composition can be spin coated to obtain NLO active films or waveguides which, upon poling, are EO active.

These chromophores can be provided with active sites for polymerization (in the X and Y groups), and in this form they are suitable as monomers for making NLO active homo- and copolymers.

Lastly, in single noncentrosymmetric crystal form, these chromophores are NLO active.

DETAILED DESCRIPTION AND PREFERRED EMBODIMENTS

The NLO chromophores of formula (I), above, in general can be prepared by the three-step procedure described below, starting with known fluorenone derivatives. In the description below, the terms D, A, X, Y, $R^1$, $R^2$, m and n have the meaning given above in connection with the NLO chromophores of general formula (I); terms not previously used will be defined when first used.

The first step involves protecting the 9-carbonyl group of the fluorenone derivative starting material:

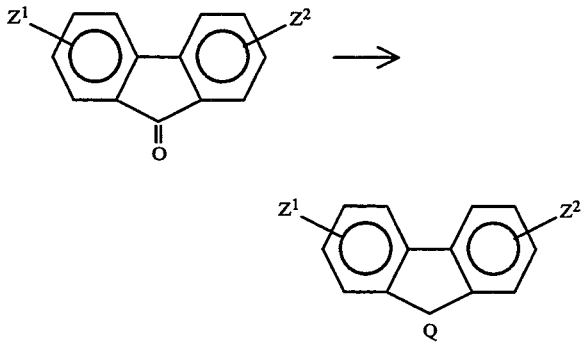

wherein $Z^1$ and $Z^2$ are are independently —$NO_2$ or a halogen (F, Cl and Br), and $\diagdown_Q\diagup$ is

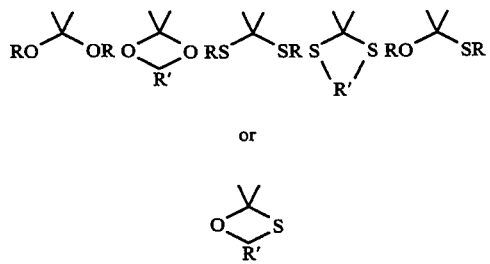

or wherein R is —$C_nH_{2n+1}$ and R' is —$(CH_2)$— (n=2-3 in each case).

In the second step, the $Z^1$ and $Z^2$ substituents of the product of the first step are replaced with the desired D—$R^1$ and D—$R^2$ groups:

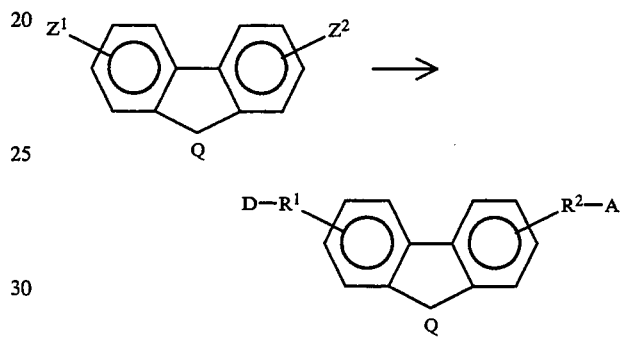

wherein $Z^1$, $Z^2$, $R^1$, $R^2$, D, A and Q have the aforestated meaning.

The third step involves deprotection of the 9-carbony group and condensation of the carbonyl, and followed by functionalization, if necessary or desirable (as in the case that X and/or Y are other than —OH, —$NH_2$, —NHR, —$NR_2$, —SH, —OR and —SR):

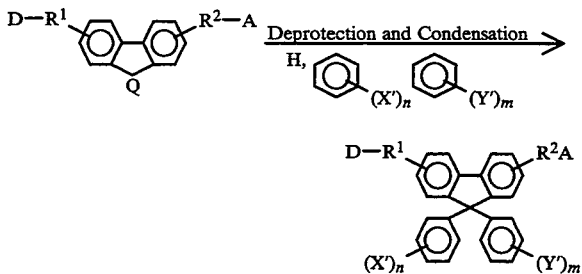

wherein X' and Y' are H, —OH, —$NH_2$, —NHR, —$NR_2$, —SH, —OR or —SR (R being as defined above in connection with formula m and n are 1-4; and A, D, R1 and R2 have the afore-stated meaning. In the event that X and/or Y are other than —OH, —$NH_2$, —NHR, —$NR_2$, —SH, —OR or —SR, then the X and/or Y substituent is introduced following deprotection by means of functional transformation, as shown below:

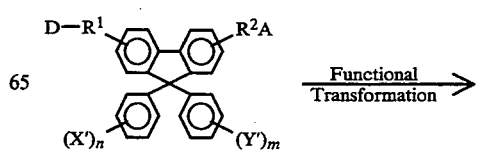

-continued
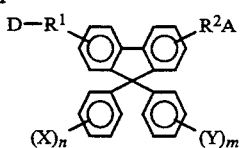
In the above scheme, the substituents all have the meanings given above.
Exemplary embodiments of steps 1 through 3 are schematically shown below:
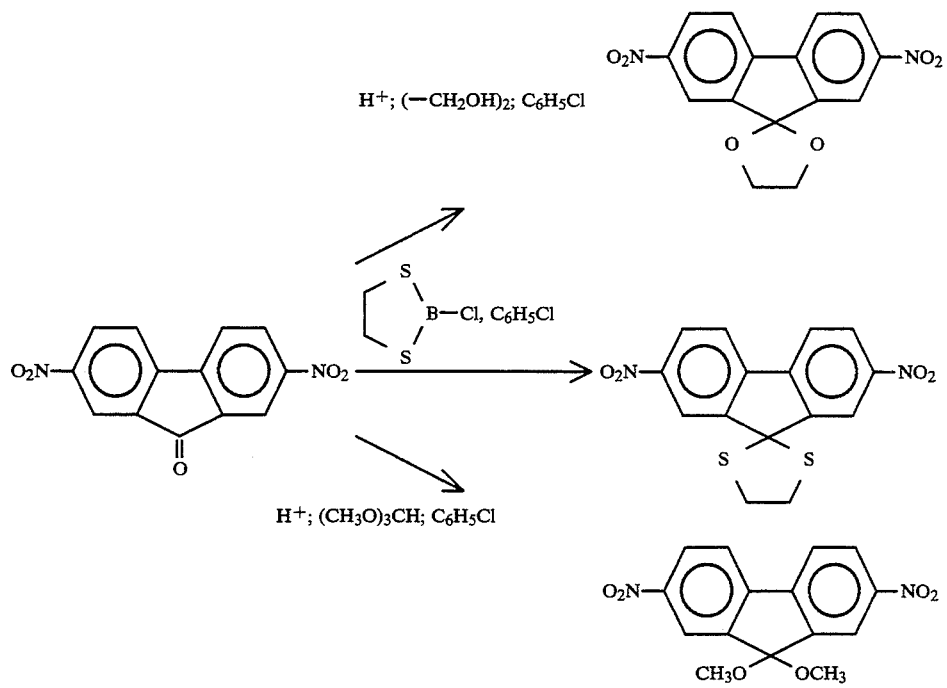
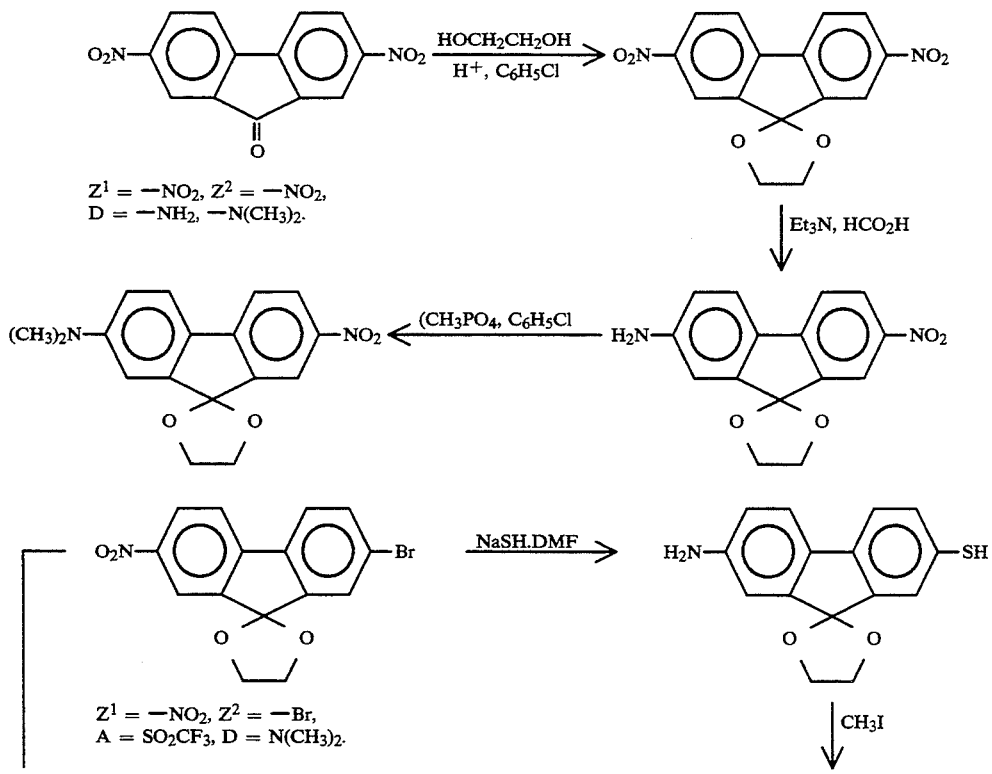

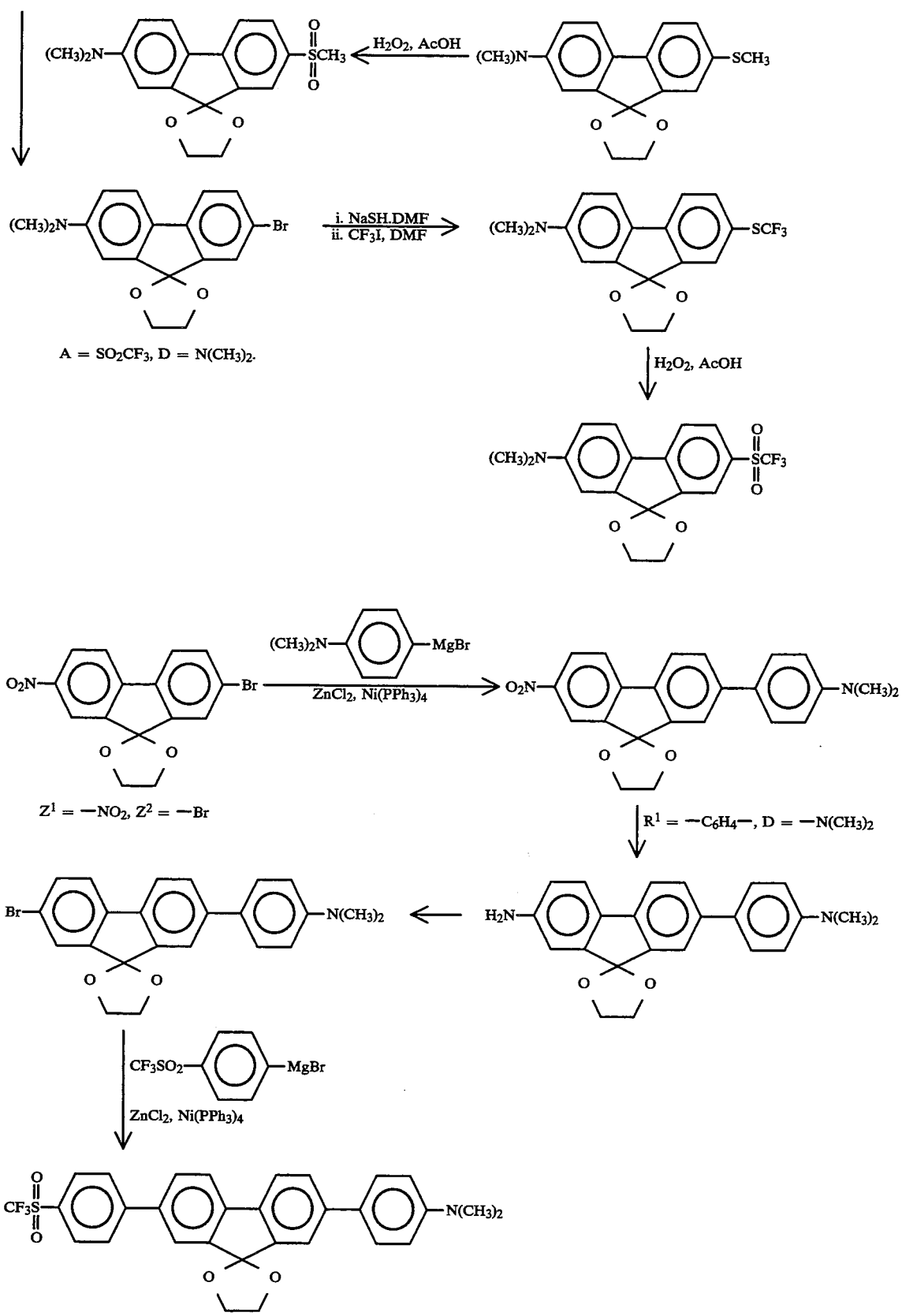
Step 3

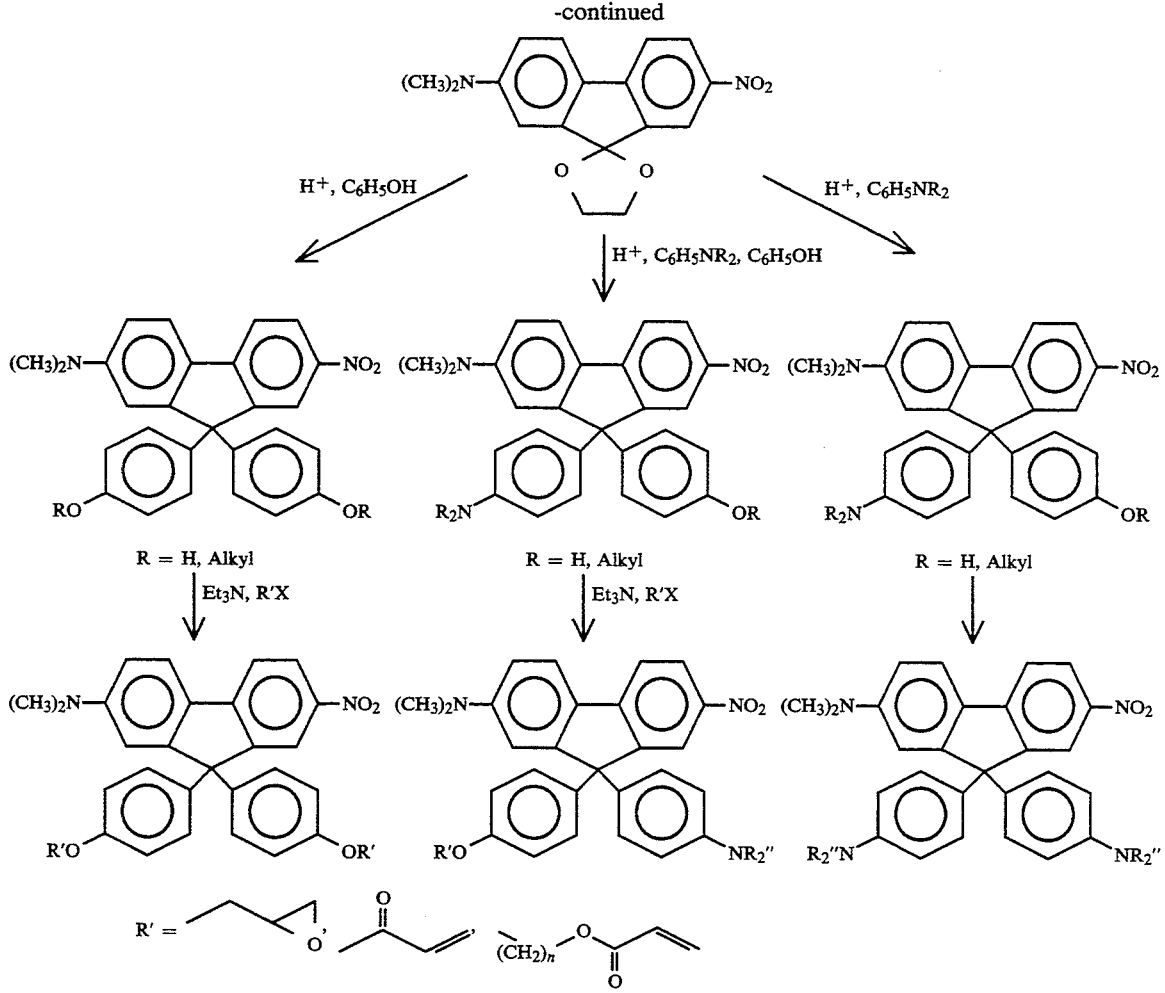

Film-forming compositions for making NLO active films and waveguides incorporating the NLO chromophores of the invention comprise a compound of formula (I), above, together with an optically clear polymer, generally an amorphous polymer, suitably selected from the group consisting of polymethacrylate (PMA), polymethylmethacrylate (PMMA), polystyrene and polycarbonate, wherein the compound of formula (I) comprises from about 1 to about 60 percent by weight of the combined weight of the compound and the polymer. These compositions can be applied to suitable substrates, from the melt or from solution in a suitable solvent, to form a film or a waveguide which is rendered NLO active after poling.

EXAMPLE 1

Preparation of:

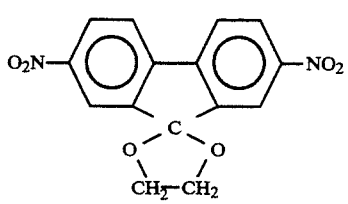

To a three neck flask equipped with a Dean-Stark condenser were added 150 parts of 2,7-dinitro-9-fluorenone, 800 parts of chlorobenzene, 25 parts of p-toluenesulfonic acid monohydrate, 100 parts of toluene and 500 parts of ethylene glycol. The mixture was stirred at 160° C. for 96 hours. After cooling the product was filtered, washed with ethyl ether (2×100 parts) and dried under vacuum. There were obtained 170 parts of product (97% yield).

The product was characterized by $^1$H and $^{13}$C NMR; its structure was consistent with that assigned. $^{13}$NMR [δ(ppm), No. of C's]:148.8, 2C; 146.7, 2C; 142.6, 2C; 126.8, 2C; 123.1, 2C; 119.3, 2C; 109.8, 1C; 66.3, 2C. $^1$H NMR [δ(ppm), No. of H's]: 8.45, 2H; 8.37, 2H; 8.22, 2H; 4.50, 4H.

EXAMPLE 2

Preparation of:

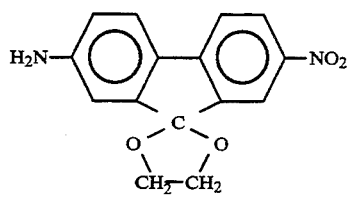

To a reaction flask were added 66.0 parts of the product of Example 1 and 1000 parts of chlorobenzene. The mixture was stirred at 100° C. until homogeneous, then 8 parts of 5% palladium on activated carbon and 250 parts of triethylamine were added. To this reaction mixture was added dropwise 10 parts of formic acid. The mixture was further heated at this temperature for 1 hour after addition, then cooled, filtered, washed with water, and dried over calcium chloride. The product, after stripping off solvent, was further purified in a chromatograph column packed with silica gel (Merck, Grade 60, 230–400 mesh) and developed by a 1:1 mixture of ethyl acetate and hexane. Forty parts product were obtained (67% yield).

The product was characterized by $^1$H and $^{13}$C NMR; its structure was consistent with that assigned. $^{13}$C NMR [δ(ppm), no. of C's]: 151.8, 1C; 147.7, 1C; 147.5, 1C; 145.1, 1C; 144.5, 1C; 126.7, 1C; 123.7, 1C; 123.1, 1C; 118.5, 1C; 118.3, 1C; 115.2, 1C; 110.4, 1C; 109.3, 1C; 66.6, 2C. $^1$H NMR [δ(ppm), no. of H's]: 8.25, 1H; 8.12, 1H; 7.65, 1H; 7.52, 1H; 6.78, 1H; 6.65, 1H; 5.85, 2H; 4.42, 2H; 4.32, 2H.

EXAMPLE 3

Preparation of:

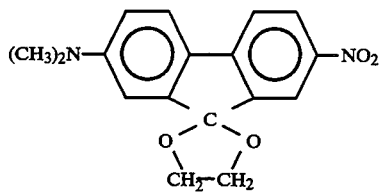

To a three neck flask were added 10 parts of the product of Example 2, 30 parts of trimethyl phosphate, 20 parts of sodium bicarbonate and 20 parts of dimethyl sulfoxide. The mixture was stirred at 160° C. for 2 hours. After cooling to room temperature, the mixture was diluted with 2000 parts of ethyl ether and washed with saturated aqueous sodium bicarbonate solution (4×500 parts). The product, after removal of solvent, was further purified in a chromatograph column packed with silica gel (Merck, Grade 60, 230–400 mesh) and developed with a mixture of ethyl acetate and hexane in 1:2 ratio. Nine parts product were thus obtained (82% yield).

The product was characterized by $^1$H and $^{13}$C NMR; its structure was consistent with that above assigned. $^{13}$C NMR [δ(ppm), No. of C's]: 152.4, 1C; 147.8, 1C; 147.4, 1C; 145.5, 1C; 145.2, 1C; 126.9, 1C; 124.1, 1C; 123.1, 1C; 118.9, 1C; 118.7, 1C; 113.8, 1C; 110.8, 1C; 107.6, 1C; 66.0, 2C; 40.3, 2C. $^1$H NMR [δ(ppm), No. of H's]: 8.2, 1H; 8.15, 1H; 7.65, 2H; 6.82, 1H; 6.75, 1H; 4.42, 4H; 3.0, 6H. X-ray crystallographic analysis on the crystalline product confirmed that it was non-centrosymmetric. The produce was monoclinic, in the P2$_1$/n space group.

EXAMPLE 4

Preparation of:

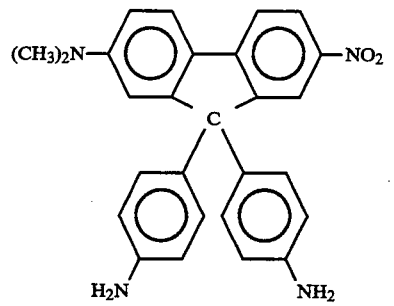

To a sealed tube equipped with a Teflon valve were added 15 parts of the product of Example 3, 15 parts of p-toluenesulfonic acid monohydrate and 60 parts of aniline. The mixture was stirred at 100° C. for 16 hours, cooled to room temperature and diluted with 100 parts of methanol. The diluted solution was added dropwise to 1000 parts of a mixed solvent of 33 vol. % methanol and 67 vol. % water. The precipitated solid was collected, dried, and purified in a chromatograph column packed with silica gel (Merck, Grade 60, 230–400 mesh), developed with a 1:1 mixture of ethyl acetate and hexane. Eleven parts product were obtained in 53% yield. The product was characterized by $^1$H and $^{13}$C NMR; its structure was consistent with that assigned. $^{13}$C NMR [δ(ppm), No. of C's]: 156.5, 1C; 153.0, 1C; 152.3, 1C; 148.1, 1C; 46.0, 1C; 145.7, 2C; 135.5, 2C; 129.6, 4C; 126.3, 1C; 124.2, 1C; 122.9, 1C; 121.7, 1C; 118.5, 1C; 115.5, 4C; 109.6, 1C; 64.7, 1C; 41.0, 2C. $^1$H NMR [δ(ppm), No. of H's]: 8.20, 1H; 8.12, 1H; 7.6, 2H; 7.0, 4H; 6.7, 2H; 6.55, 4H; 3.6, 4H; 3.0, 6H.

EXAMPLE 5

Preparation of:

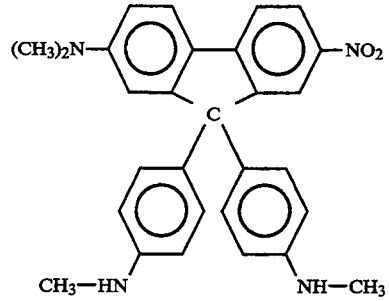

To a reaction flask were added 5 parts of the product of Example 3, 20 parts of N-methylaniline and 4.5 parts of p-toluenesulfonic acid monohydrate. The mixture was stirred at 140° C. for 3 hours, folowed by stirring at 100° C. for 16 hours. The solid product was precipitated by adding the reaction mixture to 200 parts of 30% methanol in water, and was further purified in a chromatograph column packed with silica gel (Merck, Grade 60, 230–400 mesh) and developed with a 1:1 mixture of ethyl acetate and hexane. There were obtained 4.6 parts of product in 62% yield.

The product was characterized by $^1$H and $^{13}$C NMR; its structure was consistent with that assigned. $^{13}$C NMR [δ(ppm), No. of C's]: 156.8, 1C; 153.3, 1C; 152.3, 1C; 148.6, 2C; 148.2, 1C; 146.0, 1C; 134.2, 2C; 129.7, 4C; 126.2, 1C; 124.5, 1C; 123.0, 1C; 121.7, 1C; 118.7, 1C; 115.0, 4C; 112.6, 1C; 109.4, 1C; 64.6, 1C; 41.0, 2C; 31.2, 2C. $^1$H NMR [δ(ppm), No. of H's]: 8.20, 1H; 8.12, 1H; 7.6, 2H; 7.1, 4H; 6.8, 6H; 4.15, 2H; 3.9, 2H, 3.3, 2H; 3.0, 6H; 2.85, 2H; 2.75, 2H.

EXAMPLE 6

Preparation of:

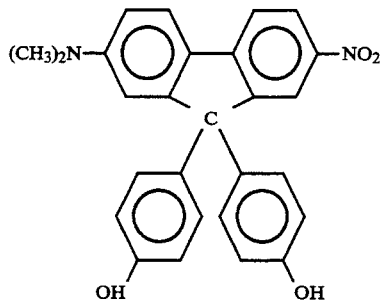

To a sealed tube equipped with a Teflon valve were added 4 parts of the product of Example 3, 9.5 parts of p-toluenesulfonic acid monohydrate and 34 parts of phenol. The mixture was stirred at 120° C. for 16 hours, cooled to room temperature and diluted with 80 parts of methanol. The diluted solution was added to a mixture of 300 parts methanol and 700 parts water. The precipitated solid was collected, dissolved in 100 parts of acetone, and re-precipitated with water. Ten parts of product were obtained in 76% yield.

The product was characterized by $^1$H and $^{13}$C NMR; its structure was consistent with that assigned. $^{13}$C NMR [δ(ppm), No. of C's]: 157.7, 2C; 157.2, 1C; 153.7, 1C; 153.4, 1C; 149.0, 1C; 146.7, 1C; 137.4, 2C; 130.4, 4C; 126.7, 1C; 124.9, 1C; 123.9, 1C; 122.0, 1C; 119.7, 1C; 116.4, 4C; 110.2, 1C; 65.4, 1C; 40.9, 2C. $^1$H NMR [δ(ppm), No. of H's]: 8.20, 1H; 8.12, 1H; 7.6, 2H; 7.0, 4H; 6.7, 2H; 6.55, 4H; 3.6, 4H; 3.0, 6H.

EXAMPLE 7

Preparation of:

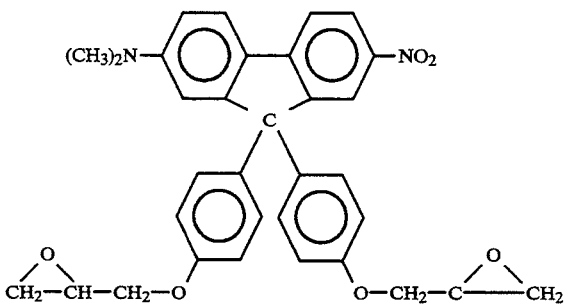

To a reaction flask were added 5 parts of the product of Example 5, 21 parts of epichlorohydrin and 0.11 part of water. The mixture was stirred at room temperature until homogeneous, 0.27 part of sodium hydroxide was added and the reaction mixture was heated at 100° C. for 1 hour. Then 1.58 parts of sodium hydroxide were added in six increments, and stirring was continued until no further exotherm was observed. Excess epichlorohydrin was distilled off under vacuum at temperature below 95° C. To the mixture were then added 2 parts of toluene. Sodium chloride precipitated and was filtered off. The product, after removal of solvent, was further purified in a chromatograph column packed with silica gel (Merck, Grade 60, 230–400 mesh), developed with a mixture of ethyl acetate and hexane. The product was 4.6 parts (84% yield).

The product was characterized by $^1$H and $^{13}$C NMR and is consistent with the assigned structure. $^{13}$C NMR [δ(ppm), No. of C's]: 158.0, 2C; 156.0, 1C; 152.3, 2C; 148.1, 1C; 146.0, 1C; 138.2, 2C; 129.7, 4C; 126.2, 1C; 124.5, 1C; 123.0, 1C; 121.7, 1C; 118.7, 1C; 115.0, 4C; 112.6, 1C; 109.4, 1C; 69.3, 2C; 64.6, 1C; 50.6, 2C; 45.2, 2C; 41.0, 2C. $^1$H NMR [δ(ppm), No. of H'S]: 8.20, 1H; 8.12, 1H; 7.6, 2H; 7.1, 4H; 6.8, 6H; 4.15, 2H; 3.9, 2H, 3.3, 2H; 3.0, 6H; 2 . 85, 2H; 2.75, 2H.

EXAMPLE 8

Measurement of Electric-Optic Coefficients of the products of Examples 3 through 6

Ten parts by weight of each of the products of Examples 3–6 were blended into a polymer matrix of 90 parts by weight of polymethylmethacrylate. Solutions of one pare of the polymer blends in three parts of diglyme were spin coated onto a quartz substrate partially covered with a 100 Angstrom thick electrically conductive aluminum layer. The aluminum layer was photolithographically defined to form slit type electrodes with dimensions 5 mm×9 mm and a distance of microns between electrodes. The diglyme solvent was evaporated at 116° C., yielding an about 1.0 micron thick polymer film. The samples were placed into a vacuum chamber, the pressure was reduced to $10^{-5}$ Torr, electrical connections were made to the aluminum electrodes in the vacuum chamber, and the samples were heated to 116° C. A DC voltage was applied to the electrodes such that the film within the electrode gap regions was subjected to a static electric field strength of 0.5 MV/cm. The sample was then permitted to cool to room temperature with the field applied. The cooled samples were mounted in a modified Senarmont compensator apparatus, ant measurements were made as described by T. Yoshimura, J. Appl. Phys. 62, 2027 (1987), using an 0.81 micron diode laser. Phase retardation vs. applied voltage showed linear relationship, establishing that the products were non-centrosymmetrically aligned and optically nonlinear. The electro-optic coefficients $r_{33}$ (pm/V) were measured at 632.8, 670 and 810 nm. The results are summarized below:

|  | Product of Example | | | |
| --- | --- | --- | --- | --- |
|  | 3 | 4 | 5 | 6 |
| $r_{33}$ at 632.8 nm | 0.69 | 0.59 | 0.68 | 0.65 |
| $r_{33}$ at 670 nm | 0.50 | 0.50 | 0.55 | 0.49 |
| $r_{33}$ at 810 nm | 0.38 | 0.36 | 0.41 | 0.37 |

The preferred embodiments of the present invention are as follows (all with reference to formula I, above):

One type of preferred embodiment is represented by compounds which are capable of undergoing polymerization. These are the compounds as defined by formula I wherein X and Y are other than —OR, —SR and —NR$_2$.

Regarding the position of the —R$^1$—D group, the 2 and 4 positions are preferred, with the 2 position being most preferred.

Regarding the position of the —R$^2$A group, the 5 and 7 positions are preferred, with the 7 position being most preferred.

Regarding m and n, 1 is the preferred embodiment.

The X substituents are preferably in the 2', 4' and/or 6' position, with the 4' position being preferred if m is 1.

The Y substituents are preferably in the 2", 4" and 6" position, with the 4" position being preferred if n is 1.

R¹ and R² are preferably Ar; phenylene and thienylene are specific examples of preferred embodiments.

A is preferably —NO₂, —CN, —SO₂R, —SO₂R$_F$, or —COOR. D is preferably —NR₂, —SR or OR.

Preferred X and Y are independently selected from —OH, —NH₂, —NHR and

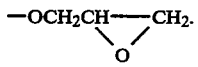

We claim:

1. Compounds of the general formula

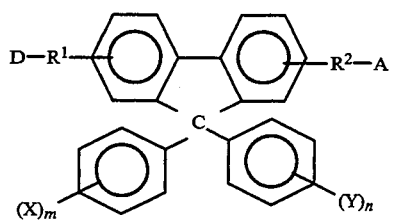

wherein
m and n are independently integers of from 1 to 4;
R¹ and R², which are the same or different in different D—R¹— and A—R²— groups, are independently —Ar—, —Ar—CH=CH— or —Ar—C≡C— wherein Ar is a divalent bridging group selected from the group consisting of a direct bond phenylene, biphenylene, naphthalene and thienylene;
A, which is the same or different in different —A—R²— groups, is —NO₂, —CN, —SO₂R, —SO₂R$_F$, —COOR, —C(CN)=C(CN)₂ and —CH=C(CN)₂ wherein
R$_F$ is —C$_n$F$_{2n+1}$ wherein n is an integer of from 1 to 10;
R is alkyl, straight chain, branched or cyclic, having from 1 to about 10 carbons;
D, which is the same or different in different D—R¹— groups, is —NH₂, —NHR, —NR₂, —OH, —OR, —SH or —SR, wherein
R is alkyl, straight chain, branched or cyclic, having from 1 to about 10 carbons;
X and Y are independently selected from the group consisting of H, —NH₂, —NHR, —NR₂, —OH, —OR, —SH, —SR, —COOH, —NCO,

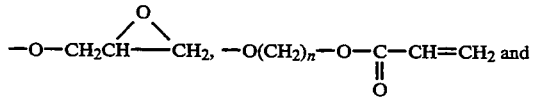

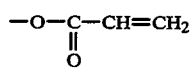

wherein
is an integer of from 1 to about 10, and
R is alkyl, straight chain, branched or cyclic, having from 1 to about 10 carbons.

2. A compound according to claim 1 wherein X and Y are independently selected from the group consisting of —NH₂, —NHR, —OH, —SH, —COOH, —NCO,

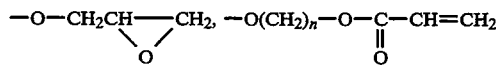

and

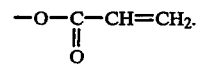

3. A compound according to claim 1 wherein X and Y are independently selected from the group consisting of H, —OR, —SR and NR₂.

4. A composition comprising a matrix of an optically clear polymer, having dispersed therein from about 1 to about 60 percent by weight of a compound according to claim 1.

5. A composition comprising a matrix of a polymer selected from the group consisting of polymethacrylate, polymethylmethacrylate, polystyrene and polycarbonate, having dispersed therein a compound according to claim 1.

6. A composition comprising a matrix of a polymer selected from the group consisting of polymethacrylate, polymethylmethacrylate, polystyrene and polycarbonate, having dispersed therein a compound according to claim 2.

7. A composition according to claim 6 wherein the polymer matrix comprises polymethacrylate, polymethylmethacrylate or mixtures thereof.

8. A composition according to claim 7 wherein the compound according to claim 1 is selected from the group consisting of

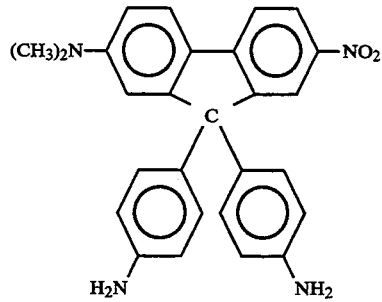

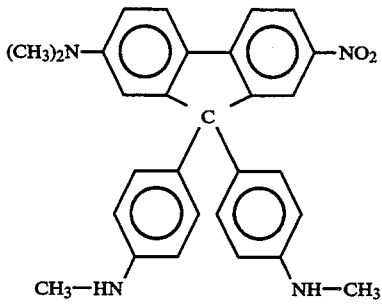

-continued

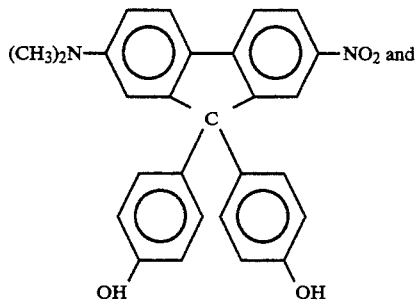

-continued

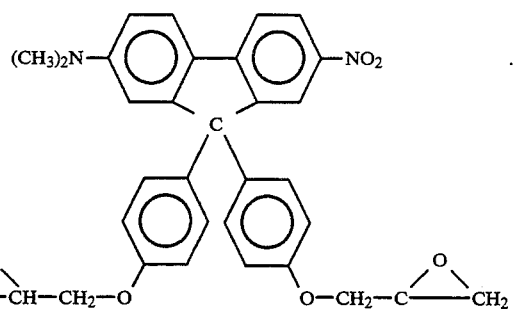

9. A composition according to claim 8 wherein the polymer matrix is polymethylmethacrylate.

10. A composition according to claim 5 which has been poled by heating above its $T_g$ in the presence of an applied electrical field, and cooling below $T_g$ in the presence of the applied field.

11. A composition according to claim 7 which has been poled by heating above its $T_g$ in the presence of an applied electrical filed, and cooling below $T_g$ in the presence of the applied field.

12. A light modulator device comprising as NLO active component a compound according to claim 1.

* * * * *